(12) United States Patent
Yang

(10) Patent No.: US 7,492,759 B2
(45) Date of Patent: Feb. 17, 2009

(54) INTERNALLY-INTEGRATED TYPE COMPUTER NETWORK SWITCHING UNIT

(75) Inventor: Ji-Chi Yang, Taipei (TW)

(73) Assignee: Inventec Corporation, Taipei (TW)

( * ) Notice: Subject to any disclaimer, the term of this patent is extended or adjusted under 35 U.S.C. 154(b) by 715 days.

(21) Appl. No.: 10/997,623

(22) Filed: Nov. 23, 2004

(65) Prior Publication Data

US 2006/0120363 A1    Jun. 8, 2006

(51) Int. Cl.
*H04L 12/50* (2006.01)
*H04L 12/56* (2006.01)

(52) U.S. Cl. .................. 370/359; 370/386; 370/400

(58) Field of Classification Search ............ 370/359, 370/360–367, 386–388, 400–402
See application file for complete search history.

(56) References Cited

U.S. PATENT DOCUMENTS

| | | | | |
|---|---|---|---|---|
| 6,721,313 | B1* | 4/2004 | Van Duyne | 370/386 |
| 2003/0031187 | A1* | 2/2003 | Heffernan et al. | 370/400 |
| 2004/0091027 | A1* | 5/2004 | Booth | 375/219 |
| 2004/0196838 | A1* | 10/2004 | Zadikian et al. | 370/360 |
| 2005/0063354 | A1* | 3/2005 | Garnett et al. | 370/351 |
| 2005/0078601 | A1* | 4/2005 | Moll et al. | 370/218 |
| 2005/0122966 | A1* | 6/2005 | Bowes | 370/360 |
| 2005/0183042 | A1* | 8/2005 | Vogel et al. | 716/1 |

* cited by examiner

*Primary Examiner*—Wing F. Chan
*Assistant Examiner*—Hong Sol Cho
(74) *Attorney, Agent, or Firm*—Jianq Chyun IP Office

(57) ABSTRACT

An internally-integrated type computer network switching unit is proposed, which is designed for internally integrated to a computer platform, such as a server, for providing the server with a network switching capability that allows the server to selectively switch between various connections to a number of network nodes for the purpose of establishing a LAN (Local Area Network); and which is characterized by that it is internally integrated to the internal circuitry of the server so that it can be implemented without having to utilize a dedicated set of microprocessor, memory, and operating system (OS), and can be directly controlled via the CPU and OS of the server. This feature allows the internally-integrated type computer network switching unit of the invention to represent a more cost-effective and highly expandable LAN solution for network applications.

10 Claims, 2 Drawing Sheets

INTERNALLY-INTEGRATED TYPE COMPUTER NETWORK SWITCHING UNIT

BACKGROUND OF THE INVENTION

1. Field of the Invention

This invention relates to computer network technology, and more particularly, to an internally-integrated type computer network switching unit which is designed for use to be internally integrated to a computer platform, such as a server, for providing the server with a network switching capability that allows the server to selectively switch its external connections between a number of network nodes, including, for example a group of other computer platforms, data storage units such as RAID (Redundant Array of Independent Disks) units, printers, Internet access devices, and so on, for the purpose of establishing a LAN (Local Area Network) to allow the server to exchange data with these network nodes.

2. Description of Related Art

LAN switches are network devices that are used as main components in the building of a LAN (Local Area Network) system. In actual application, a LAN switch is typically designed as a separate unit for external connection to a computer platform, such as a server, for the server to be linked via the LAN switch to a number of network nodes, such as PCs, printers, data storage units such as RAID (Redundant Array of Independent Disks) units, Internet access devices, and so on, to build a LAN system with these network nodes. In operation, the LAN switch is capable of allowing the server to selectively switch its connections between these network nodes for exchange data with the selected network node.

Presently, most LAN switches are designed as separate units for external connection to servers, i.e., in a LAN system, the server and the LAN switch are two separate units, and the LAN switch is externally connected to the server to provide the server with network switching functions.

One drawback to the externally-connected LAN switches, however, is that it requires the LAN switch hardware architecture to be implemented with a dedicated set of microprocessor, memory, and operating system (OS), i.e., the LAN switch has its own CPU and OS aside from the server, which makes the external-connected LAN switches quite costly to manufacture and therefore represents an uneconomical LAN solution.

SUMMARY OF THE INVENTION

It is therefore an objective of this invention to provide an internally-integrated type computer network switching unit which can be implemented without having to utilize a dedicated set of microprocessor, memory, and operating system, so as to reduce manufacture and utilization costs.

It is another objective of this invention to provide an internally-integrated type computer network switching unit which represents a more cost-effective and highly expandable solution for LAN systems.

The internally-integrated type computer network switching unit according to the invention is designed for use to be internally integrated to a computer platform, such as a server, for providing the server with a network switching capability that allows the server to selectively switch its external connections between a number of network nodes, including, for example a group of other computer platforms, data storage units such as RAID (Redundant Array of Independent Disks) units, printers, Internet access devices, and so on, for the purpose of establishing a LAN (Local Area Network) to allow the server to exchange data with these network nodes.

The internally-integrated type computer network switching unit according to the invention is characterized by that it is internally integrated to the internal circuitry of the server so that it can be implemented without having to utilize a dedicated set of microprocessor, memory, and operating system (OS), and can be directly controlled via the CPU and OS of the server. This feature allows the internally-integrated type computer network switching unit of the invention to represent a more cost-effective and highly expandable LAN solution for network applications.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The internally-integrated type computer network switching unit according to the invention is disclosed in full details by way of preferred embodiments in the following with reference to the accompanying drawings.

Figure 1:
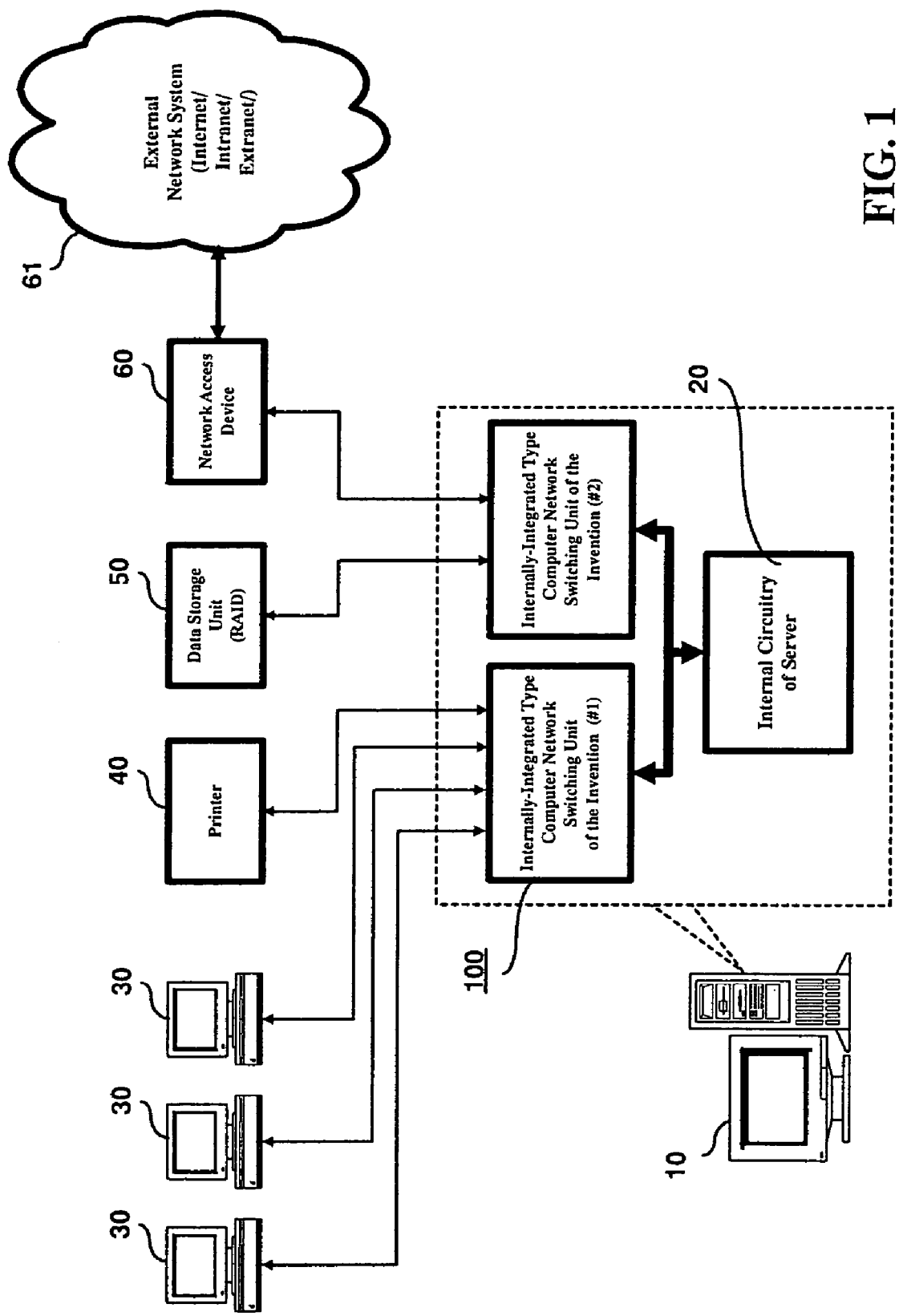
FIG. 1 is a schematic diagram showing the application architecture of the internally-integrated type computer network switching unit according to the invention.

FIG. 1 is a schematic diagram showing the application architecture of the internally-integrated type computer network switching unit of the invention 100. As shown, in practical application, the internally-integrated type computer network switching unit of the invention 100 is realized, for example, as an add-on circuit board that can be internally integrated to the internal circuitry 20 of a computer platform, such as a server 10, for providing the server 10 with a network switching capability that allows the server 10 to selectively switch between the various connections between a number of network nodes, including, for example a group of other computer platforms 30 (such as PCs), a printer 40, a data storage unit 50 such as a RAID (Redundant Array of Independent Disks) unit, a network access device 60, and so forth, for the purpose of establishing a LAN (Local Area Network) system that allows the server 10 to exchange data with these network nodes 30, 40, 50, 60, and further allows the server 10 to be linked via the network access device 60 to a large external network system 61, such as the Internet, an intranet system, or an extranet system.

In practical application, each circuit board of the internally-integrated type computer network switching unit of the invention 100 is capable of providing a fixed number of linking ports for external linking to network nodes, such as 4 (in various other embodiment, it can also be 6, 8, 12, or more). Therefore, the user can increase the number of linking ports for the server 10 simply by installing additional circuit boards of the internally-integrated type computer network switching unit of the invention 100. In the embodiment of FIG. 1, for example, two circuit boards of the internally-integrated type computer network switching unit of the invention 100 are internally integrated to the internal circuitry 20 of the server 10 to provide a twofold node linking capacity.

Figure 2:
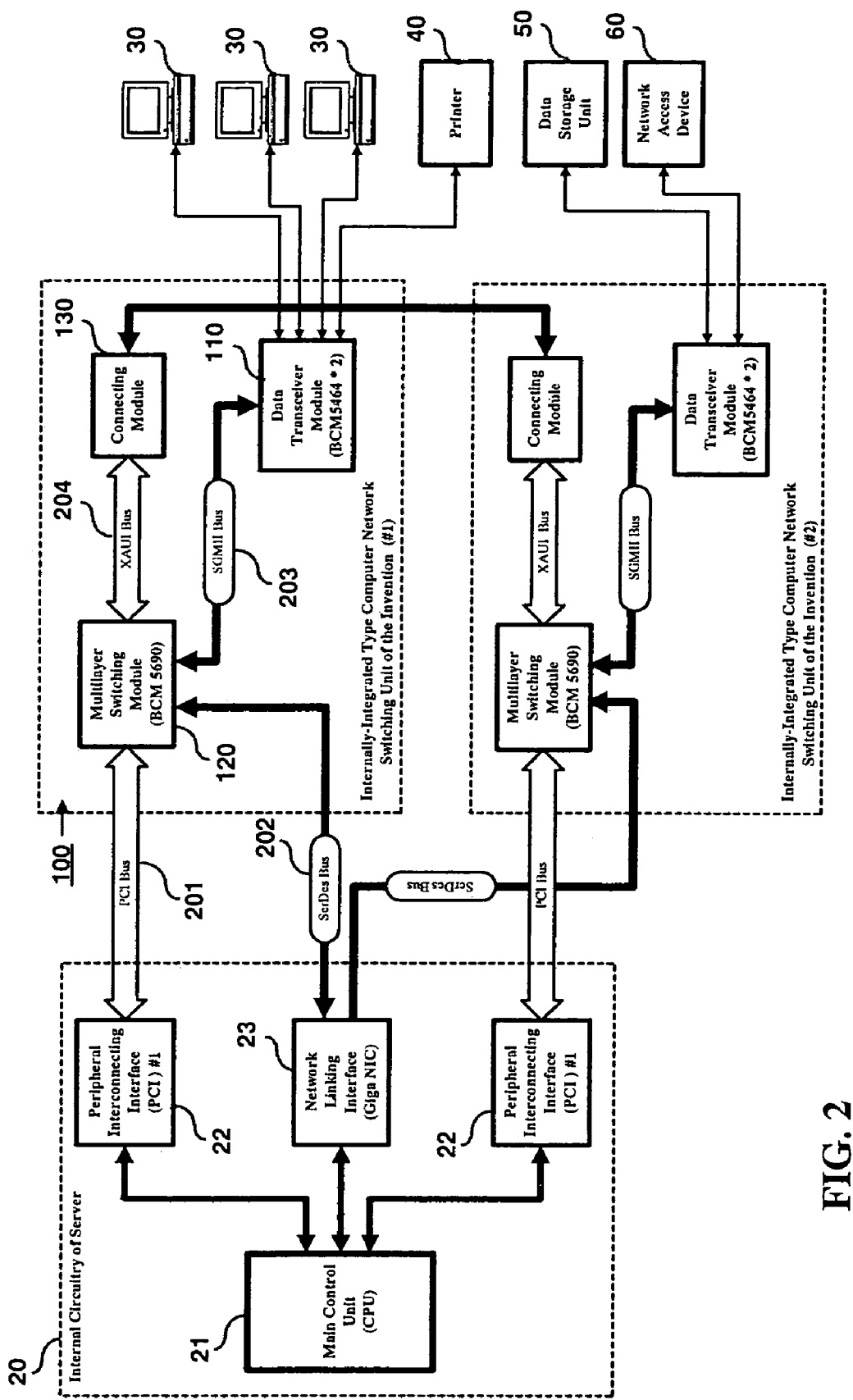
FIG. 2 is a schematic diagram showing the modularized component model of the internal architecture of the internally-integrated type computer network switching unit according to the invention.

Moreover, as shown in FIG. 2, in practical implementation, the internal circuitry 20 of the server 10 should include a main control unit 21 (i.e., a CPU and its associated control programs), at least one peripheral interconnecting interface 22, and a network linking interface 23, where the peripheral interconnecting interface 22 is for example compliant with the PCI (Peripheral Component Interconnect) standard, and the network linking interface 23 is for example compliant with the Giga NIC (Network Interface Card) standard.

The modularized component model of the internally-integrated type computer network switching unit of the invention 100 comprises: (a) a data transceiver module 110; (b) a multilayer switching module 120; and (c) a connecting module 130.

The data transceiver module 110 is for example a Quad 10/100/1000 BASE-T Gigabit Ethernet Transceiver IC module, which is used for multiple external connections to the network nodes 30, 40, 50, 60 for transmitting data to and receiving data from these network nodes 30, 40, 50, 60. In realization, the data transceiver module 110 is for example a Broadcomm BCM 5464 chip.

The multilayer switching module 120 is, for example, a 12-Port Gigabit Ethernet Multilayer Switch module, such as a Broadcomm BCM 5690 chip, and which is coupled via a first-type bus interface 201, such as a PCI (Peripheral Component Interconnect) compliant bus interface, to the peripheral interconnecting interface 22 in the internal circuitry 20 of the server 10; via a second-type bus interface 202, such as an SGMII (Serial Gigabyte Media Independent Interface) compliant bus interface, to the network linking interface 23 in the internal circuitry 20 of the server 10; and via a third-type bus interface 203, such as a SerDes (Serializer/Deserializer) compliant bus interface, to the data transceiver module 110. Functionally, this architecture allows the multilayer switching module 120 to be controlled by the main control unit 21 in the server 10 via the first-type bus interface 201 for switching between the multiple connections to the network nodes 30, 40, 50, 60 that are linked to the data transceiver module 110 for the main control unit 21 to selectively communicate with a selected one of these network nodes 30, 40, 50, 60.

The connecting module 130 is internally coupled via a fourth-type bus interface 204, such as an XAUI (eXtended Attachment Unit Interface) compliant bus interface, to the multilayer switching module 120 for externally connecting to another circuit board of the internally-integrated type computer network switching unit of the invention 100 for the purpose of expanding the number of node linking ports for the server 10. In the embodiment of FIG. 2, for example, two circuit boards of the internally-integrated type computer network switching unit of the invention 100 are internally integrated to the internal circuitry 20 of the server 10; however, the number of the circuit boards of the internally-integrated type computer network switching unit of the invention 100 is unrestricted to 2, and can be more, which is dependent on the number of PCI-based peripheral interconnecting interfaces 22 installed in the server 10.

Referring to FIG. 1 together with FIG. 2, in practical application, it is assumed that the server 10 wants to transfer data to one of the network nodes, such as the data storage unit 50, then the main control unit 21 of the server 10 will issue a switching request via the PCI-based peripheral interconnecting interface 22 and the PCI-based first-type bus interface 201 to the multilayer switching module 120, requesting the multilayer switching module 120 to perform a switching action on the data transceiver module 110 for the purpose of linking the data storage unit 50 to the network linking interface 23, thus allowing the main control unit 21 to be actively linked to the data storage unit 50 via the network linking interface 23 and the internally-integrated type computer network switching unit of the invention 100, for storing data into or retrieving data from the data storage unit 50.

On the other hand, if the server 10 wants to gain access to another network node, such as the network access device 60 for connection to the Internet, then the main control unit 21 of the server 10 will likewise issue a switching request via the PCI-based peripheral interconnecting interface 22 and the PCI-based first-type bus interface 201 to the multilayer switching module 120, requesting the multilayer switching module 120 to perform a switching action on the data transceiver module 110 for the purpose of linking the data storage unit 50 to the network linking interface 23, allowing the main control unit 21 to be actively linked to the network access device 60 via the network linking interface 23 and the internally-integrated type computer network switching unit of the invention 100, for linking via the network access device 60 to the external network system 61 such as the Internet.

In conclusion, the invention provides an internally-integrated type computer network switching unit which is designed for internally integrated to a computer platform, such as a server, for providing the server with a network switching capability that allows the server to selectively switch between various connections to a number of network nodes for the purpose of establishing a LAN (Local Area Network); and which is characterized by that it is internally integrated to the internal circuitry of the server so that it can be implemented without having to utilize a dedicated set of microprocessor, memory, and operating system (OS), and can be directly controlled via the CPU and OS of the server. This feature allows the internally-integrated type computer network switching unit of the invention to represent a more cost-effective and highly expandable LAN solution for network applications. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An internally-integrated type computer network switching unit for use to be internally integrated to a computer platform whose internal circuitry includes a main control unit, at least one peripheral interconnecting interface, and a network linking interface for allowing the computer platform to selectively switch between various connections to a number of network nodes; the inernally-integrated type computer network switching unit comprising:

a data transceiver module, which is used for multiple external connections to the network nodes for transmitting data to and receiving data from the network nodes;

a multilayer switching module, which is coupled via a first-type bus interface to the peripheral interconnecting interface in the internal circuitry of the computer platform, via a second-type bus interface to the network linking interface in the internal circuitry of the computer platform and via a third-type bus interface to the data transceiver module; and which is capable of being controlled by the main control unit via the first-type bus interface for swithching between the connections between the network nodes linked to the data transceiver module for the main control unit to communicate with a selected one of the network nodes; and a connecting module, which is internally coupled via a fourth-type bus interface to the multilayer switching module for externally connecting to another instance of the internally-integrated type computer network switching unit for the purpose of expanding the network linking capacity of the computer platform, wherein the multilayer switching module is further coupled to the main control unit in the internal circuitry of the computer platform via the second-type bus interface and the network linking interface.

2. The internally-integrated type computer network switching unit of claim 1, wherein the computer platform is a server.

3. The internally-integrated type computer network switching unit of claim 1, wherein the peripheral interconnecting interface is a PCI (Peripheral Component Interconnect) compliant interface.

4. The internally-integrated type computer network switching unit of claim 1, wherein the network linking interface is a Giga NIC (Network Interface Card) compliant interface.

5. The internally-integrated type computer network switching unit of claim 1, wherein the data transceiver module is a Quad 10/100/1000 BASE-T Gigabit Ethernet Transceiver IC module.

6. The internally-integrated type computer network switching unit of claim 1, wherein the multilayer switching module is a 12-Port Gigabit Ethernet Multilayer Switch module.

7. The internally-integrated type computer network switching unit of claim 1, wherein the first-type bus interface is a PCI (Peripheral Component Interconnect) compliant bus interface.

8. The internally-integrated type computer network switching unit of claim 1, wherein the second-type bus interface is an SGMII (Serial Gigabyte Media Independent Interface) compliant bus interface.

9. The internally-integrated type computer network switching unit of claim 1, wherein the third-type bus interface is a SerDes (Serializer/Deserializer) compliant bus interface.

10. The internally-integrated type computer network switching unit of claim 1, wherein the fourth-type bus interface is an XAUI (extended Attachment Unit Interface) compliant bus interface.

* * * * *